United States Patent
Roh et al.

(10) Patent No.: US 6,722,146 B2
(45) Date of Patent: Apr. 20, 2004

(54) REFRIGERATOR HAVING MULTIMEDIA FUNCTIONS AND METHOD FOR CONTROLLING THE SAME

(75) Inventors: Young Hoon Roh, Seoul (KR); Jung Ho Kim, Kyungki-do (KR); Jin Chul Cho, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/377,640

(22) Filed: Mar. 4, 2003

(65) Prior Publication Data

US 2003/0167785 A1 Sep. 11, 2003

(30) Foreign Application Priority Data

Mar. 6, 2002 (KR) ........................................ 2002-12015

(51) Int. Cl.[7] ................................................ F25B 19/00
(52) U.S. Cl. .......................................... 62/231; 236/51
(58) Field of Search .......................... 62/231, 157, 126; 236/51, 46 R

(56) References Cited

U.S. PATENT DOCUMENTS 6,453,687 B2 * 9/2002 Sharood et al. ................ 62/127
2001/0048030 A1 * 12/2001 Sharood et al. ............. 236/49.3

* cited by examiner

*Primary Examiner*—Marc Norman
(74) *Attorney, Agent, or Firm*—Greenblum & Bernstein, P.L.C.

(57) ABSTRACT

A refrigerator which is capable of being connected to the Internet and performing a variety of multimedia functions, and a method for controlling the same. A multimedia controller which controls the multimedia functions of the refrigerator is driven under the control of a refrigerator controller which controls refrigerating and freezing environments of the refrigerator. Even when an accident, such as a power failure or etc., occurs, the multimedia controller is given time in which it can be normally or closed down or ended. Therefore, a warning window is not displayed on a display unit of the refrigerator upon the driving of the multimedia controller, thus reassuring a user that the refrigerator has not failed.

13 Claims, 3 Drawing Sheets

REFRIGERATOR HAVING MULTIMEDIA FUNCTIONS AND METHOD FOR CONTROLLING THE SAME

BACKGROUND OF THE INVENTION

1. Field of the Invention

The present invention relates to refrigerators and similar appliances and methods for controlling the same, and more particularly to a refrigerator manufactured to perform multimedia functions, and a method for controlling the same. In particular, when the refrigerator is powered on/off or reset, errors are prevented from occurring in a multimedia controller which controls the multimedia functions of the refrigerator.

2. Description of the Related Art

With the increase in Internet use, recently, the use of electronic products which can be connected to the Internet without using computers has become increasingly widespread. Thus, in modern society, people can access the Internet and surf thereon through the use of portable electronic products, such as cellular phones or personal digital assistants (PDAs), without requiring computers.

In particular, as the Internet becomes more and more widespread, ordinary housekeepers have come comprise a large pool of potential Internet users, resulting in an increase in the number of home appliances which additionally have a network connection function, thus enabling the housekeeper to access use the Internet through the use of the home appliances.

Such network connectable home appliances are constructed to perform a variety of multimedia functions to provide network connection environments and Internet surfing environments.

For example, in such a multimedia function-refrigerator 1, as shown in FIG. 1, a user can access the Internet over a network through the use of a display unit 2 formed on the refrigerator 1, serving as a touch pad. Through the display unit 2, the user is also able to control the operation of the refrigerator 1 and check the condition or state thereof.

FIG. 2 shows the construction of a control system of the above-mentioned multimedia function-refrigerator. As shown in this drawing, the refrigerator constructed to perform a variety of multimedia functions, such as Internet access, etc., comprises a refrigerator controller 11 for controlling refrigerating and freezing environments of the refrigerator, a multimedia controller 12 for controlling the multimedia functions, and an interface 13 for converting the formats of signals sent and received between the refrigerator controller 11 and the multimedia controller 12 into those appropriate to each other's standards. A power supply 14 includes a power source 14a for supplying power to the multimedia controller 12, and a rectifier 14b rectifies the power from the power source 14a.

A power on/off control switch 15 is further provided in the multimedia function-refrigerator to supply or disconnect block power from the power supply 14 to the multimedia controller 12. Upon receiving the power from the power supply 14, the multimedia controller 12 displays an operating window indicative of an initial operating state of the refrigerator on the display unit of the refrigerator and sends various information necessary to the refrigerator controller 11 thereto via the interface 13, so as to operate the refrigerator.

However, when power is suddenly interrupted, the probability that errors will occur in the multimedia controller is high because a registry thereof remains not arranged or configured for closing down. In particular, if errors occur in the multimedia controller, the refrigerator controller may perform a faulty operation since it is operated under the control of the multimedia controller. In this case, the user may suspect or believe that the refrigerator is not operating properly, although no problem is present in the refrigerating and freezing environments or compartments of the refrigerator.

SUMMARY OF THE INVENTION

Therefore, the present invention has been made in view of the above problems, and it is an object of the present invention to provide a refrigerator which is capable of being connected to the Internet and performing a variety of multimedia functions, and a method for controlling the same, wherein a multimedia controller of the refrigerator is operated under the control of a refrigerator controller adapted for controlling refrigerating and freezing environments of the refrigerator, so that the multimedia functions can be stably performed.

In accordance with one aspect of the present invention, the above and other objects can be accomplished by the provision of a refrigerator for performing multimedia functions. Such a refrigerator includes a power supply that supplies power to the refrigerator, a refrigerator controller that receives the power from the power supply to control refrigerating and freezing environments or compartments of the refrigerator, and a multimedia controller that receives the power from the power supply via the refrigerator controller to control the multimedia functions of the refrigerator. An interface converts signals exchanged between the multimedia controller and the refrigerator controller into signals respectively complying with one of the multimedia controller's standard and the refrigerator controller's standard.

In accordance with another aspect of the present invention, a method is provided for controlling a refrigerator performing multimedia functions. The method comprises inputting a reset signal to a refrigerator controller to reset the refrigerator, the refrigerator controller controlling refrigerating and freezing environments or compartments of the refrigerator, sending a drive signal from the refrigerator controller to a multimedia controller, the multimedia controller controlling the multimedia functions of the refrigerator, and driving the multimedia controller in response to the sent drive signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
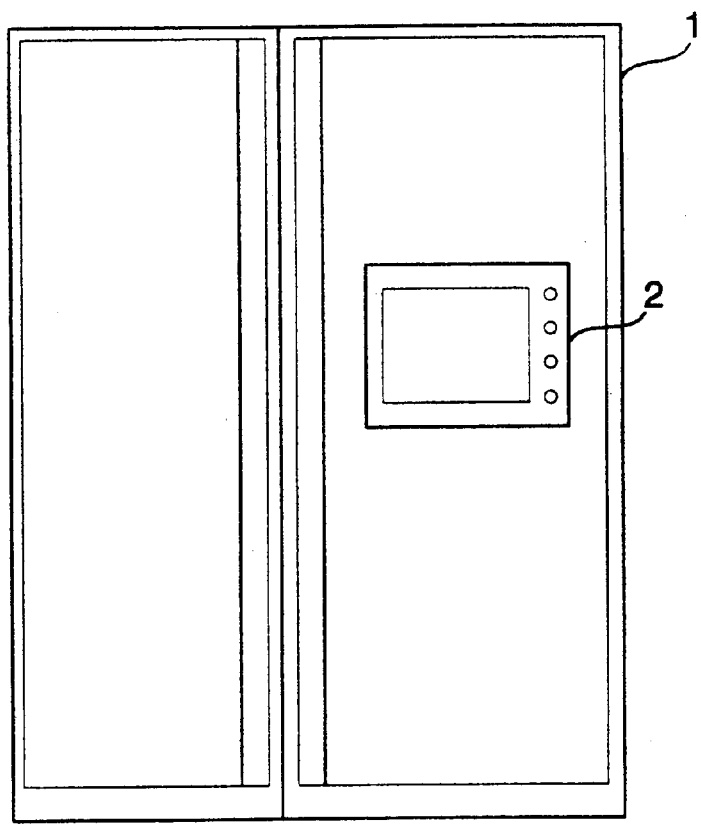
FIG. 1 is a view showing the outer appearance of a multimedia refrigerator.
Figure 2:
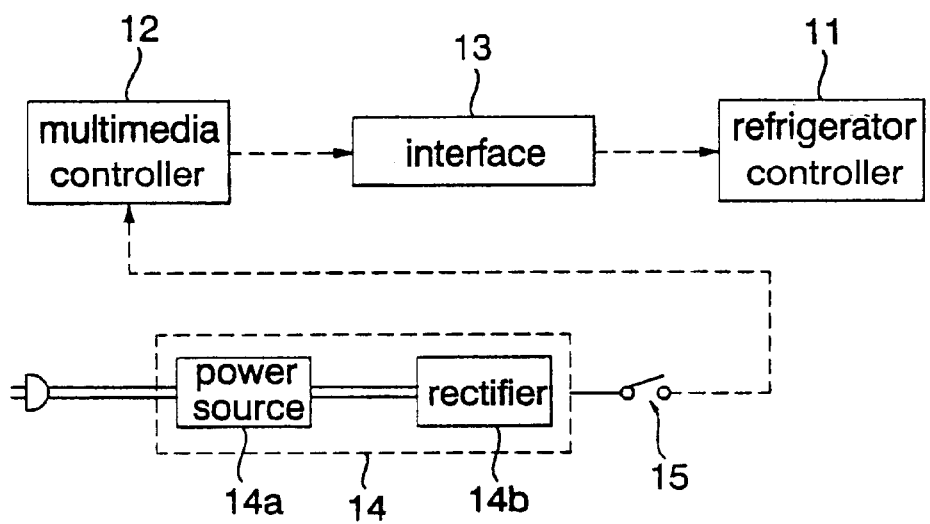
FIG. 2 is a block diagram showing the construction of the control system of a multimedia conventional refrigerator.
Figure 3:
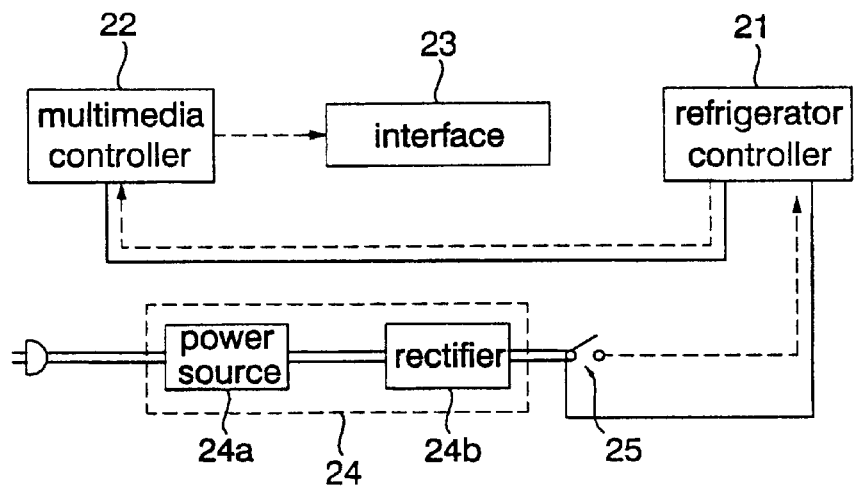
FIG. 3 is a block diagram showing the construction of a refrigerator control system in accordance with the present invention.
Figure 4:
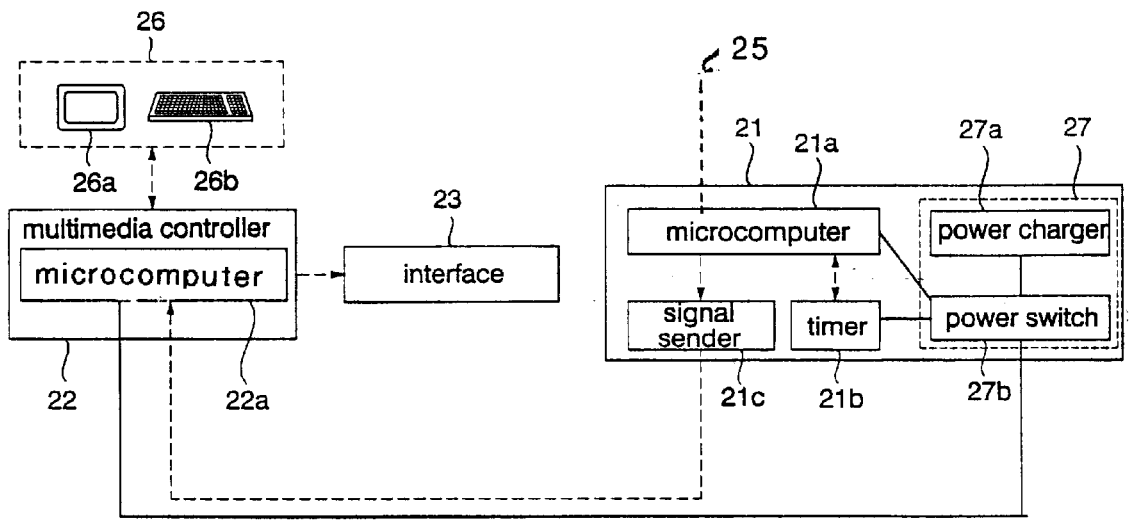
FIG. 4 is a detailed block diagram of the refrigerator control system in accordance with the present invention.

FIG. 3 is a block diagram showing the construction of a refrigerator control system in accordance with the present invention, and FIG. 4 is a detailed block diagram of the refrigerator control system in accordance with the present invention. As shown in these drawings, the refrigerator (Internet refrigerator) according to the present invention comprises a power supply 24 for supplying power to the Internet refrigerator, a reset switch 25 for controlling the ON/OFF states of the power supplied from the power supply 24, a refrigerator controller 21 for receiving the power from the power supply 24 via the switch 25, a multimedia controller 22 for receiving the power from the power supply 24 via the refrigerator controller 21, and an interface 23 for converting the formats of signals sent and received between the multimedia controller 22 and the refrigerator controller 21 into those appropriate to each other's standards.

The refrigerator controller 21 includes a microcomputer 21a for controlling the refrigerating and freezing environments of the refrigerator, a timer 21b for counting the time elapsed from the input of a reset signal from the reset switch 25 to the microcomputer 21a, and a signal sender 21c for sending an output signal from the microcomputer 21a externally of the refrigerator controller.

The multimedia controller 22 includes a multimedia microcomputer 22a for controlling the multimedia functions of the refrigerator. An input/output unit 26 is connected to the multimedia controller 22 to allow a user to control the operation of the refrigerator and check the resulting state. The input/output unit 26 includes, as examples, a touch pad 26a and/or a keyboard 2b formed on the refrigerator. Any other input/output devices can additionally or alternatively be used.

The refrigerator controller 21 further includes a switching circuit 27 for selectively supplying the power from the power supply 24 to the refrigerator controller 21 and the multimedia controller 22. The switching circuit 27 is provided with a power charger 27a (such as e.g., a capacitor or other energy storage device) for charging itself to a predetermined level with the power from the power supply 24, and a power switch 27b for selectively supplying the charged power from the power charger 27a to the refrigerator controller 21 and the multimedia controller 22.

Particularly, when the supply of the power from the power supply 24 is suddenly turned off and, then, turned on by the reset switch 25, that is, when the reset signal from the reset switch 25 is inputted, the microcomputer 21a counts the time elapsed from the input of the reset signal through the timer 21b.

The multimedia microcomputer 22a is drivable after a predetermined reference period of time elapses from the input of the reset signal to the refrigerator controller.

In other words, the power from the power supply 24 is primarily supplied to the refrigerator controller 21. At this time, the reset signal from the reset switch 25, generated e.g., by the user's operation, is also inputted to the microcomputer 21a in the refrigerator controller 21. Namely, if the user wishes to turn or/off the power of the refrigerator or reset the refrigerator, he/she can input a reset command to the refrigerator by turning on/off the switch 25. In the alternative power can be automatically reset at the end of e.g., a power interruption or blackout. Upon receiving the reset command from the user, the reset switch 25 sends the reset signal to the microcomputer 21a.

In response to the reset signal inputted from the reset switch 25, the refrigerator controller 21 is reset and then sends a drive signal to the multimedia controller 22 after the lapse of the predetermined reference time period from the input of the reset signal.

The microcomputer 21a in the refrigerator controller 21 compares the elapsed time counted by the timer 21b with the predetermined reference time period and generates the drive signal when the counted elapsed time becomes greater than the predetermined reference time period. The drive signal generated by the microcomputer 21a is sent to the multimedia microcomputer 22a via the signal sender 21c to drive the multimedia controller 22. In response to the drive signal inputted after the predetermined reference time period elapses from the input of the reset signal to the refrigerator controller 21, the multimedia microcomputer 22a is turned on so as to drive the multimedia controller 22.

Accordingly, the multimedia controller 22 is not immediately turned off or on in response to the reset signal from the reset switch 25, and its drive state is determined on the basis of the drive signal from the refrigerator controller 21. As a result, the multimedia controller 22 can be stably driven even when the power of the refrigerator is suddenly interrupted due to a power failure, etc.

In other words, the refrigerator controller 21 receives the reset signal inputted thereto, and then sends the drive signal to the multimedia controller 22 after the lapse of the predetermined reference time period from the input of the reset signal during which the multimedia controller 22 can normally end its operation. Thus, when the power of the refrigerator is suddenly interrupted, the operation of the multimedia controller 22 can be stably ended during the predetermined time period until the drive signal is inputted, without being abnormally ended or being subject to occurrence of an error. Therefore, the multimedia controller 22 can normally control multimedia functions without displaying an error image on the display unit of the refrigerator upon receiving the drive signal.

If the drive signal is inputted to the multimedia controller 22 to drive it before the reference time period elapses, the operation of the multimedia controller 22 will be abnormally ended upon occurrence of an accident such as a power failure or etc. As a result, because the multimedia controller 22 is driven at the same time that the power is supplied to the conventional refrigerator, a warning window indicating the abnormal ending of the operation of the multimedia controller will be displayed on the display unit of the refrigerator.

However, according to the present invention, while the reference time period elapses after the power is supplied to the refrigerator controller 21, the multimedia controller 22 performs a normal ending operation or a scanning operation of checking an abnormal state of a drive. Therefore, upon receiving the drive signal inputted thereto, the multimedia controller 22 can normally control multimedia functions without displaying a warning window on the display unit.

Further, the power supply 24 includes a power source 24a for receiving power through a power cord, and a rectifier 24b for rectifying the power received by the power source 24a. In FIGS. 3 and 4, dotted lines indicate the flows of the reset signal from the reset switch, the drive signal from the refrigerator controller and a drive signal inputted from the multimedia controller to the interface in response to the drive signal from the refrigerator controller, and a solid line indicates the flow of the power supplied from the power supply.

Figure 5:
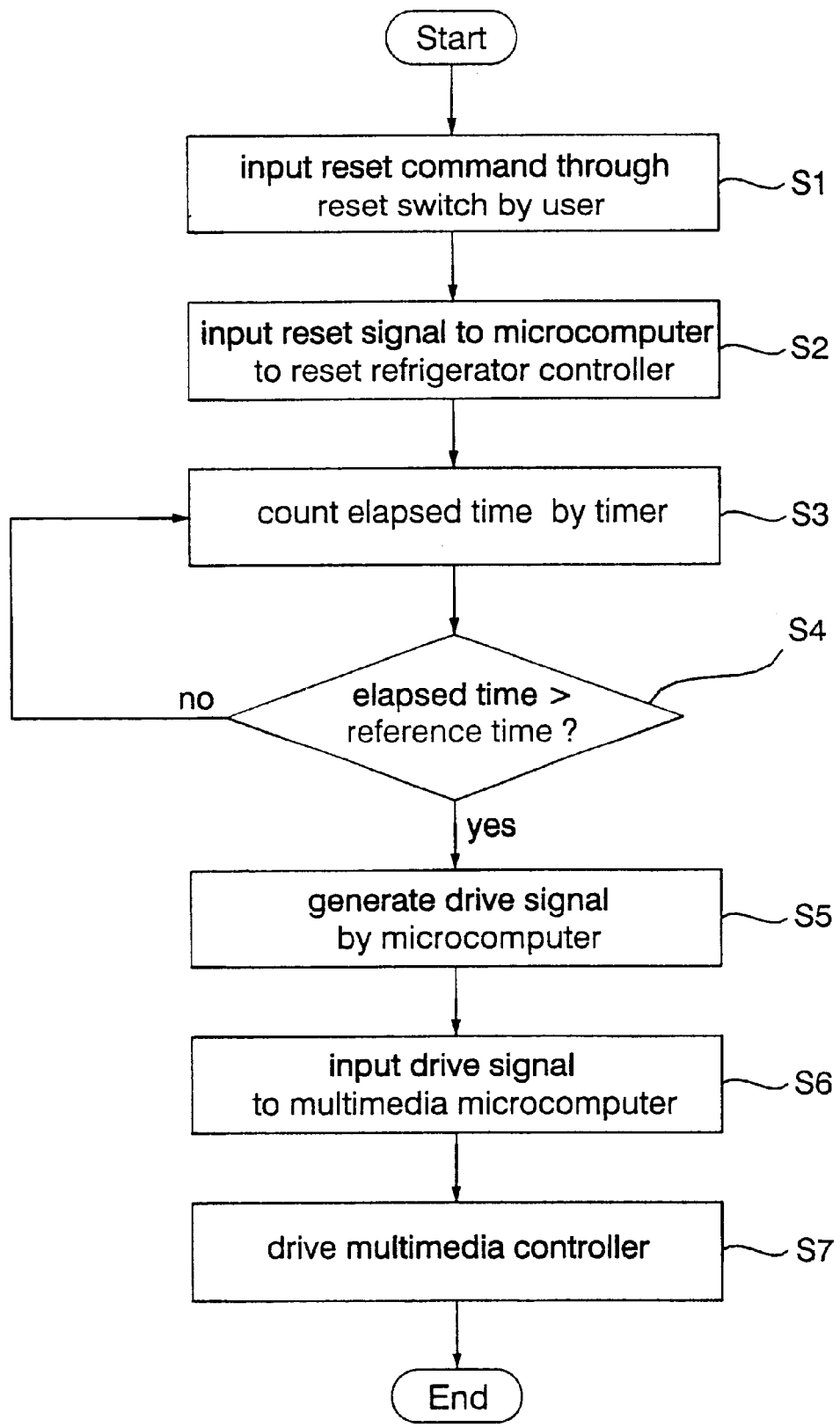
FIG. 5 is a flow chart illustrating a method for controlling the refrigerator in accordance with the present invention.

Next, a method for controlling the refrigerator in accordance with the present invention will be described with reference to a flow chart of FIG. 5.

At the first step S1, the user inputs the reset command to the refrigerator using the reset switch 25.

At the second step S2, in response to the reset command inputted at the first step S1, the reset signal is transferred to the microcomputer 21a in the refrigerator controller 21 to reset the refrigerator controller 21.

At the third step (S3 and S4), the timer 21b interworking with the microcomputer 21a counts the time elapsed from the input of the reset signal to the microcomputer 21a, and the microcomputer 21a compares the counted elapsed time with the predetermined reference period of time.

The reference time period can be preset in the microcomputer 21a in the refrigerator controller 21 in a manufacturing process of the refrigerator. Alternatively, the reference time period may be modified according to purposes for use or as needed.

At the fourth step S5, if the counted elapsed time is determined to be greater than the predetermined reference time period at the third step, the microcomputer 21a generates the drive signal to drive the multimedia controller 22.

At the fifth step S6, the drive signal generated at the fourth step is sent to the multimedia controller 22 via the signal sender 21c, and the multimedia microcomputer 22a receives the sent drive signal.

Finally, the multimedia controller 22 is driven in response to the drive signal sent to the multimedia microcomputer 22a (S7).

As apparent from the above description, the present invention provides a refrigerator which is capable of being connected to the Internet and performing a variety of multimedia functions, and a method for controlling the same, wherein a multimedia controller adapted for controlling the multimedia functions of the refrigerator is driven under the control of a refrigerator controller adapted for controlling refrigerating and freezing environments of the refrigerator. Even when an accident, such as a power failure or etc., occurs, the multimedia controller is given time in which it can be normally ended or closed down. Therefore, a warning window is not displayed on a display unit of the refrigerator upon the driving of the multimedia controller, thus reassuring a user that the refrigerator will not fail.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. In addition, while the described exemplary embodiment has been set forth with respect to a refrigerator having refrigerating and freezing compartments, it is apparent that the features of the present invention are applicable to any appropriate appliance and such applications are within the scope of the present invention.

The present disclosure relates to subject matter contained in priority Korean Application No. 2002-0012015, filed on Mar. 6, 2002, which is herein expressly incorporated by reference in its entirety.

What is claimed is:

1. A refrigerator for performing multimedia functions, comprising:
   a power supply that supplies power to said refrigerator;
   a refrigerator controller that receives said power from said power supply to control refrigerating and freezing environments of said refrigerator;
   a multimedia controller that receives said power from said power supply via said refrigerator controller to control the multimedia functions of said refrigerator; and
   an interface that converts signals exchanged between said multimedia controller and said refrigerator controller into signals respectively complying with one of a standard of said multimedia controller and a standard of said refrigerator controller.

2. The refrigerator as set forth in claim 1, further comprising a reset switch that turns ON/OFF supply of said power from said power supply to said refrigerator controller and multimedia controller to reset said refrigerator controller and said multimedia controller.

3. The refrigerator as set forth in claim 2, wherein said refrigerator controller comprises a microcomputer that controls the refrigerating and freezes environments of said refrigerator, and generates a drive signal in response to a reset signal input from said reset switch to control ON/OFF states of said multimedia controller.

4. The refrigerator as set forth in claim 3, wherein said refrigerator controller further comprises a timer that counts time elapsed from the input of said reset signal from said reset switch to said microcomputer, said microcomputer generating said drive signal if the elapsed time counted by said timer is greater than a predetermined reference time period.

5. The refrigerator as set forth in claim 3, wherein said refrigerator controller further comprises a signal sender that sends said drive signal generated by said microcomputer to said multimedia controller.

6. The refrigerator as set forth in claim 5, wherein said multimedia controller comprises a multimedia microcomputer that controls the multimedia functions of said refrigerator, said multimedia microcomputer being turned on in response to said drive signal.

7. The refrigerator as set forth in claim 3, wherein said refrigerator controller further comprises switching device that selectively supplies said power from said power supply to said refrigerator controller and said multimedia controller.

8. The refrigerator as set forth in claim 7, wherein said switching device comprises:
   a power charger that is charged with said power from said power supply to a predetermined level; and
   a power switch that selectively supplies the charged power from said power charger to said refrigerator controller and said multimedia controller.

9. A method for controlling a refrigerator performing multimedia functions, said method comprising:
   inputting a reset signal to a refrigerator controller to reset said refrigerator, said refrigerator controller controlling refrigerating and freezing environments of said refrigerator;
   sending a drive signal from said refrigerator controller to a multimedia controller, said multimedia controller controlling the multimedia functions of said refrigerator; and
   driving said multimedia controller in response to said drive sent signal sent.

10. The method as set forth in claim 9, wherein inputting comprises allowing input of said reset signal through a reset switch, said reset switch being operated to reset said refrigerator.

11. The method as set forth in claim 9, further comprising setting a reference period of time in said refrigerator controller before said sending is performed, said sending comprising further sending said drive signal from said refrigerator controller to said multimedia controller after said reference time period, from the input of said reset signal, elapses.

12. The method as set forth in claim 11, wherein said further sending comprises:

allowing said refrigerator controller to count time elapsed from the input of said reset signal;

further allowing said refrigerator controller to compare the counted elapsed time with said reference time period; and additionally allowing said refrigerator controller to generate said drive signal if the counted elapsed time is greater than said reference time period.

13. The method as set forth in claim 11, wherein said reference time period is modifiable.

* * * * *